Jan. 4, 1927.  
R. E. CUNNINGHAM  
1,612,908  
CLOD BREAKING ATTACHMENT FOR PLOWS  
Filed March 23, 1926  
2 Sheets-Sheet 2
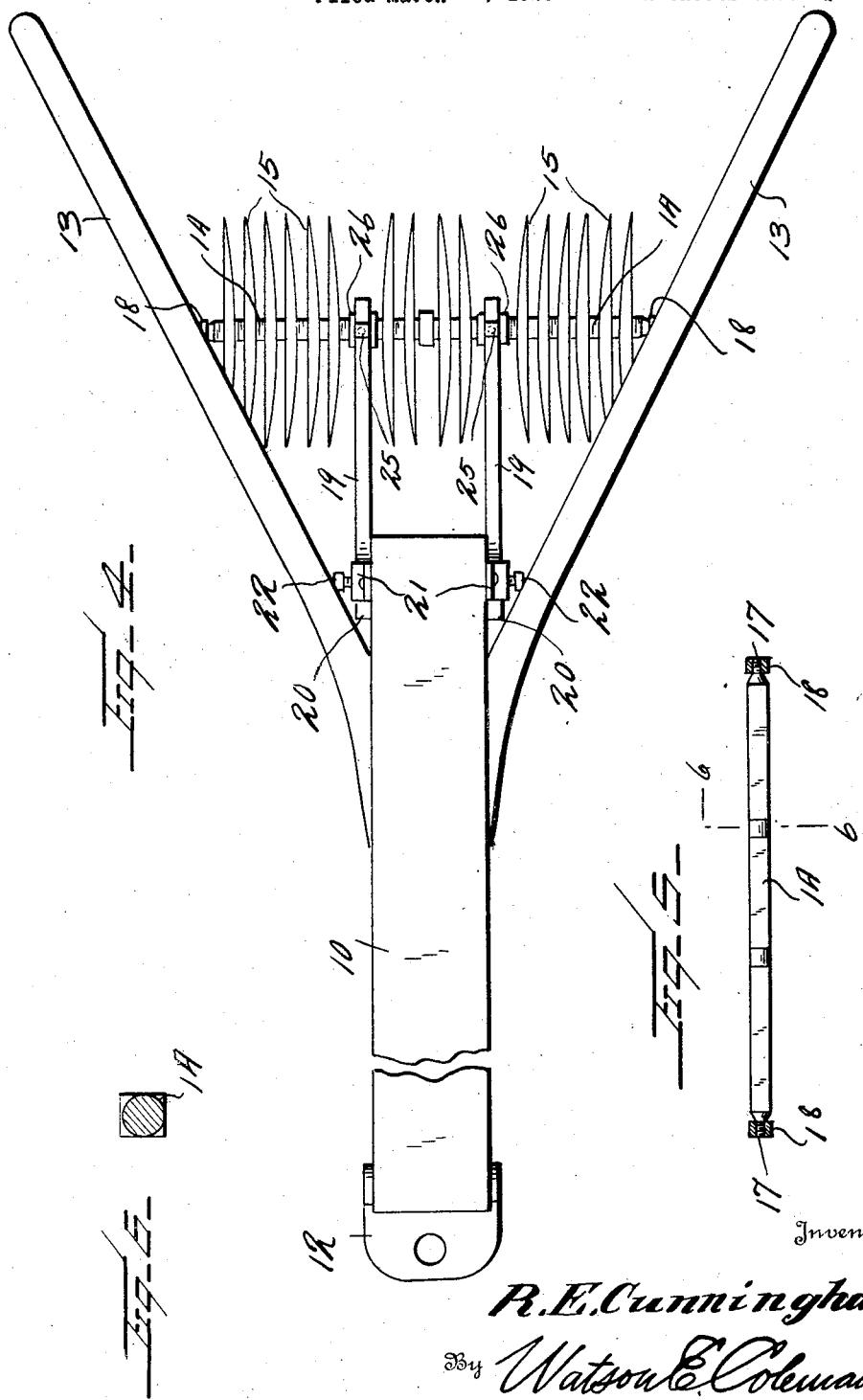
Inventor  
R.E.Cunningham  
By Watson E. Coleman  
Attorney Patented Jan. 4, 1927.

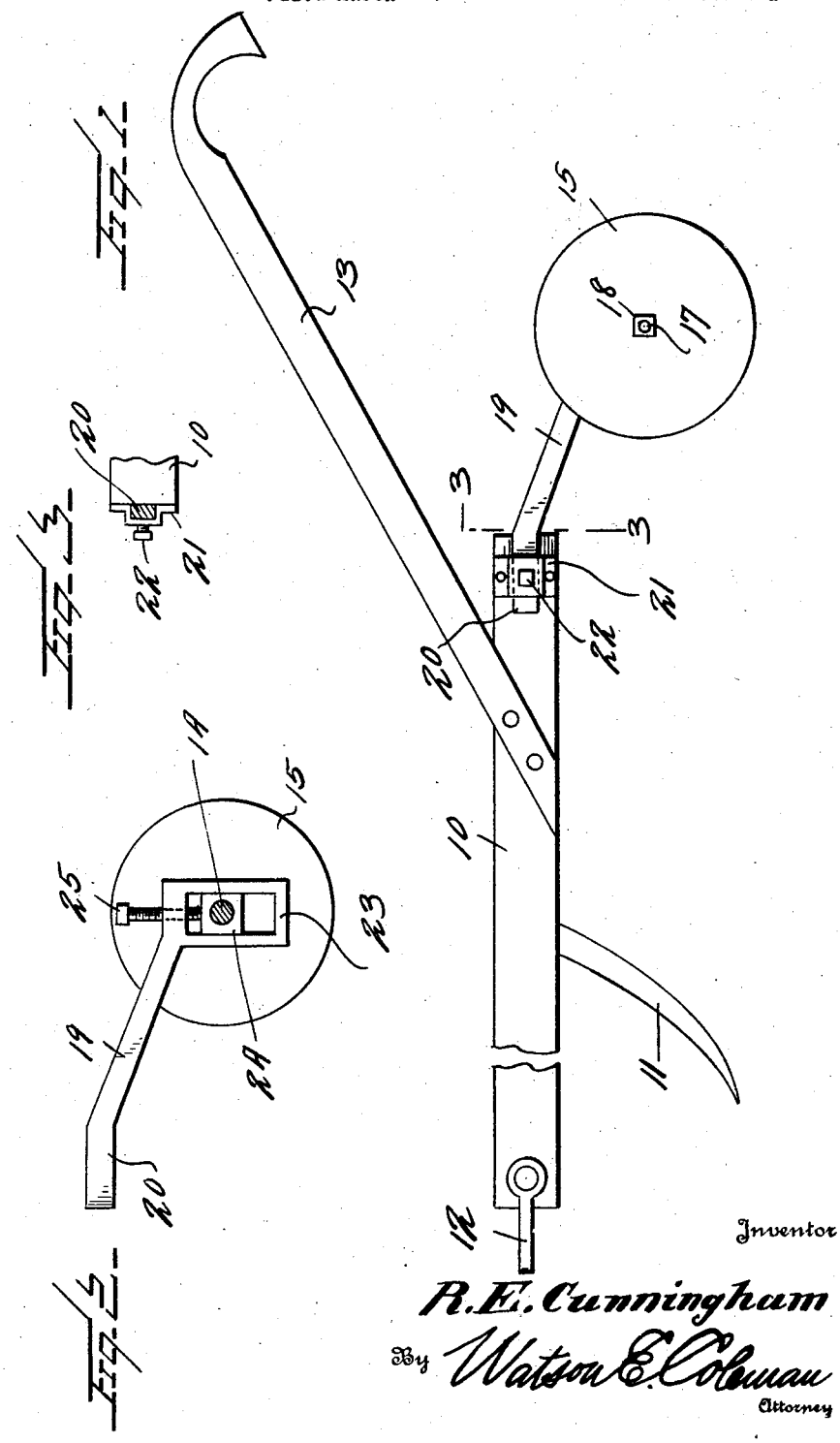

1,612,908

UNITED STATES PATENT OFFICE.

ROBERT EARL CUNNINGHAM, OF FANNIN COUNTY, GEORGIA.

CLOD-BREAKING ATTACHMENT FOR PLOWS.

Application filed March 23, 1926. Serial No. 96,777.

This invention relates to plows and the general object of the invention is to provide a combined plow and clod breaker so that at the time plowing is done clods may be broken up without the necessity of again going over the plow land with harrows or like devices for the purpose of breaking up the clods.

A further object of the invention is to provide an attachment which may be readily applied to any ordinary plow and which attachment supports a series of clod breaking disks.

Another object is to so construct the attachment that the disks may be raised or lowered or set nearer to or further from the plow.

Other objects will appear in the course of the following description.

My invention is illustrated in the accompanying drawings wherein:—

Figure 1 is a side elevation of a plow with my clod breaking attachment applied thereto;

Fig. 2 is an elevation of the attachment showing the shaft 14 in section and one of the boxes for said shaft;

Fig. 3 is a section on the line 3—3 of Figure 1;

Fig. 4 is a top plan view of the structure shown in Figure 1;

Fig. 5 is an elevation of the shaft 14, the caps or nuts 18 being in section,

Fig. 6 is a section on the line 6—6 of Figure 5.

Referring to these drawings 10 designates the plow beam which may be of any suitable character and carries the plow 11 which also may be of any suitable character. The forward end of the plow beam has the usual clevis 12 and attached to the plow beam and extending upward therefrom, are the handles 13. So far I have described an ordinary plow frame of the common type.

My invention consists in disposing behind the plow 11 a series of harrowing or clod breaking disks and to this end I provide a disk supporting shaft or axle 14 which, as illustrated is square in cross section wherein the axle engages the disks 15. This axle at its ends is screw-threaded as at 17, to receive the caps 18 and intermediate its ends at two points, the axle is round in cross section so that it may be rotatably mounted in arms or brackets 19. These arms extend upward and forward at a slight angle and at their forward ends are horizontal, as at 20, and these forward ends are adapted to be inserted and adjusted through straps 21 bolted to the rear end of the plow beam on each side thereof.

The portion 20 of each bracket is apertured for the passage of the bolt 22. The rear end of each bracket is formed with a vertical recess or slot 23 and disposed in this recess is a bearing member 24 through which the axle 14 passes and by which it is carried. This bearing member 24 is vertically adjustable in the corresponding recess of the corresponding bracket by means of a screw 25 or equivalent device. Thus the disks 15 may be set to cut more or less deeply by adjusting these screws 25.

Washers 26 are disposed between the squared portions of the axle 14 and the bearing member 24 so as to permit the axle to turn easily. Each of the disks 15, of course, is formed with a square central aperture through which the squared portions of the axle 14 extend and thus the disks turn with the axle. Preferably, these disks are concavo-convex and have the form of the ordinary harrow disk and may be of any desired or requisite diameter.

With this construction it is obvious that as the plow operates all of the clods will be broken up and the ground left in very excellent condition for cultivation, whereas with the ordinary plow, after the plow has been used, the plowed ground must be gone over with a harrow, as for instance a disk harrow, in order to break up the clods. The attachment may be readily applied to the plow or as readily removed. The device is very simple and has been found to be thoroughly effective in use.

I claim:—

1. A clod breaking attachment for plows comprising an axle having squared portions, disks mounted upon the squared portions of the ale, a pair of brackets rotatably supporting the axle, means whereby the axle may be adjusted vertically in the brackets, and means for clamping the forward ends of the brackets on each side of the plow beam.

2. The combination with a plow beam and a plow mounted thereon, of an axle disposed rearward of the plow beam and below the same, brackets rotatably supporting the axle and extending upward and forward therefrom and disposed at their forward ends on each side of the plow team, straps engaging each face of the plow beam and the brackets, bolts passing through the plow beam, said straps, and the brackets, and clod breaking disks mounted upon the axle and rotating therewith.

In testimony whereof I hereunto affix my signature.

ROBERT EARL CUNNINGHAM.